United States Patent
Xue et al.

(10) Patent No.: US 9,697,852 B2
(45) Date of Patent: Jul. 4, 2017

(54) SINGLE COIL TURN DATA WRITER

(71) Applicant: Seagate Technology LLC, Cupertino, CA (US)

(72) Inventors: JianHua Xue, Maple Grove, MN (US); Debin Wang, Eden Prairie, MN (US); Huaqing Yin, Eden Prairie, MN (US); John M. Wolf, Maple Grove, MN (US); Erik J. Hutchinson, Eden Prairie, MN (US); Wei Tian, Eden Prairie, MN (US); Yonghua Chen, Edina, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/934,926

(22) Filed: Nov. 6, 2015

(65) Prior Publication Data

US 2017/0133043 A1    May 11, 2017

(51) Int. Cl.
*G11B 5/127*   (2006.01)
*G11B 5/17*    (2006.01)
*G11B 5/60*    (2006.01)

(52) U.S. Cl.
CPC .............. *G11B 5/17* (2013.01); *G11B 5/6082* (2013.01)

(58) Field of Classification Search
None
See application file for complete search history.

(56) References Cited

U.S. PATENT DOCUMENTS

| | | | |
|---|---|---|---|
| 3,535,466 A | 10/1970 | Foster | |
| 3,660,617 A | 5/1972 | Hagopian | |
| 4,413,297 A * | 11/1983 | Tanaka | G11B 5/1278 360/125.08 |
| 6,221,218 B1 * | 4/2001 | Shi | G11B 5/3109 204/192.2 |
| 6,285,528 B1 * | 9/2001 | Akiyama | G11B 5/1278 360/125.27 |
| 6,621,659 B1 * | 9/2003 | Shukh | G11B 5/0245 360/125.43 |
| 6,671,127 B2 | 12/2003 | Hsu et al. | |
| 6,671,128 B2 | 12/2003 | Crawford | |
| 7,099,121 B2 | 8/2006 | Parker et al. | |
| 7,100,266 B2 * | 9/2006 | Plumer | G11B 5/1278 216/65 |
| 8,593,761 B1 | 11/2013 | Liu et al. | |
| 8,625,235 B2 * | 1/2014 | Takano | G11B 5/1278 360/125.14 |
| 8,786,983 B1 * | 7/2014 | Liu | G11B 5/3123 360/123.02 |
| 8,817,418 B1 * | 8/2014 | Matsuo | G11B 5/315 360/125.02 |
| 8,867,168 B2 * | 10/2014 | Ota | G11B 5/1278 360/125.16 |
| 9,082,428 B1 * | 7/2015 | Xue | G11B 5/17 |
| 9,159,340 B1 * | 10/2015 | Qiu | G11B 5/17 |

(Continued)

*Primary Examiner* — Will J Klimowicz
(74) *Attorney, Agent, or Firm* — Hall Estill Attorneys at Law

(57) ABSTRACT

A data writer may be configured with at least a write pole continuously extending from an air bearing surface to a via. The write pole can contact at least one yoke that contacts the write pole. The write pole and yoke may each be disposed between and separated from a write coil that has a single turn and continuously extends to opposite sides of the write pole.

20 Claims, 4 Drawing Sheets

(56) References Cited

U.S. PATENT DOCUMENTS

| | | | |
|---|---|---|---|
| 9,230,570 B1* | 1/2016 | Yin | G11B 5/3133 |
| 9,384,769 B2* | 7/2016 | Qiu | G11B 5/1278 |
| 2003/0039068 A1* | 2/2003 | Crawford | G11B 5/127 |
| | | | 360/123.06 |
| 2003/0142440 A1* | 7/2003 | Clinton | B82Y 10/00 |
| | | | 360/123.02 |
| 2005/0105213 A1* | 5/2005 | Takeo | G11B 5/1278 |
| | | | 360/125.21 |
| 2005/0111138 A1* | 5/2005 | Yamakawa | G11B 5/3116 |
| | | | 360/125.17 |
| 2006/0209459 A1* | 9/2006 | Im | G11B 5/1278 |
| | | | 360/125.03 |
| 2006/0256473 A1* | 11/2006 | Lim | G11B 5/1278 |
| | | | 360/125.12 |
| 2007/0025018 A1* | 2/2007 | Lim | G11B 5/11 |
| | | | 360/125.17 |
| 2007/0035884 A1* | 2/2007 | Lim | G11B 5/012 |
| | | | 360/317 |
| 2009/0067098 A1* | 3/2009 | Kim | G11B 5/1278 |
| | | | 360/313 |
| 2009/0116144 A1* | 5/2009 | Lee | G11B 5/1278 |
| | | | 360/125.01 |
| 2010/0277832 A1* | 11/2010 | Bai | G11B 5/1278 |
| | | | 360/125.03 |
| 2014/0307349 A1* | 10/2014 | Liu | G11B 5/1278 |
| | | | 360/234.5 |

* cited by examiner

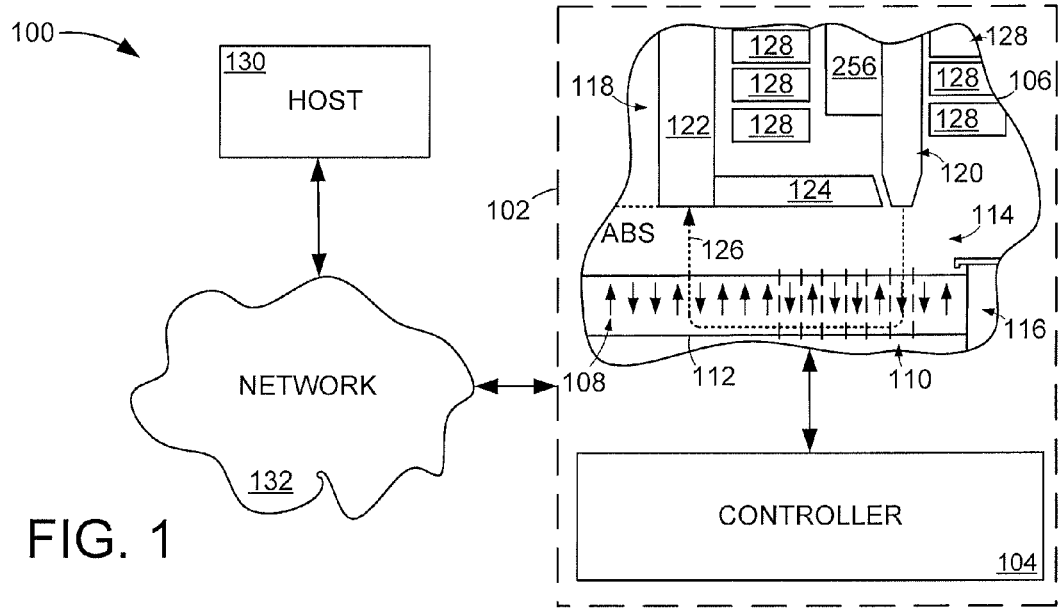
FIG. 1
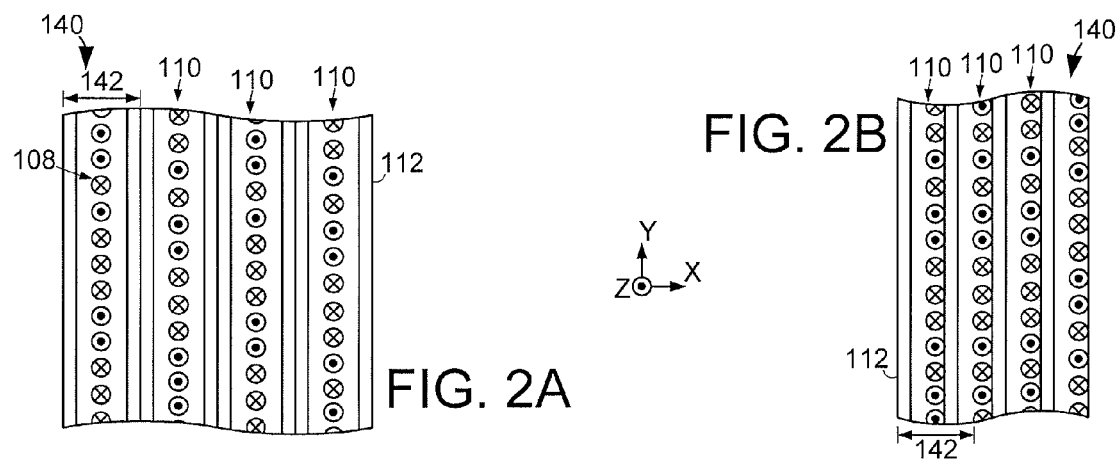
FIG. 2A
FIG. 2B
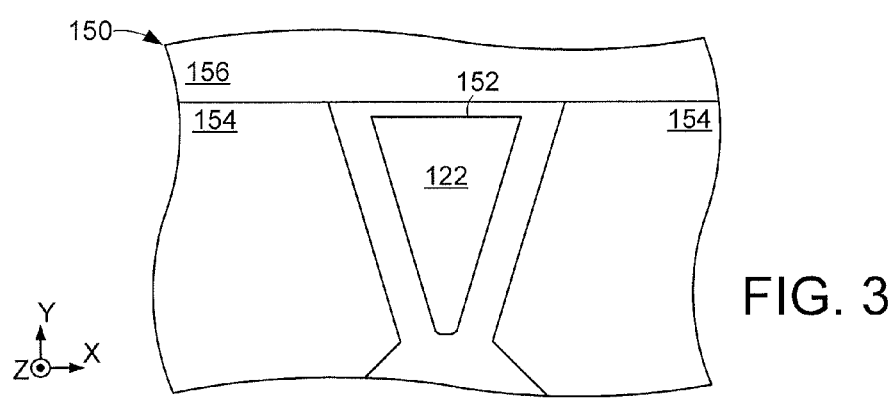
FIG. 3

SINGLE COIL TURN DATA WRITER

SUMMARY

A data writer, in accordance with assorted embodiments, has a write pole continuously extending from an air bearing surface to a via. The write pole is disposed between and separated from a write coil that has a single turn and continuously extends to opposite sides of the write pole.

BRIEF DESCRIPTION OF THE DRAWINGS

FIG. 1 displays a line representation of an example data storage system capable of employing a data writer in accordance with assorted embodiments.

FIGS. 2A and 2B show top view line representations of portions of an example data storage medium that may be used with in the data storage system of FIG. 1.

FIG. 3 is an air bearing view line representation of a portion of an example data writer that may be used in the data storage system of FIG. 1.

DETAILED DESCRIPTION

Figure 4A:
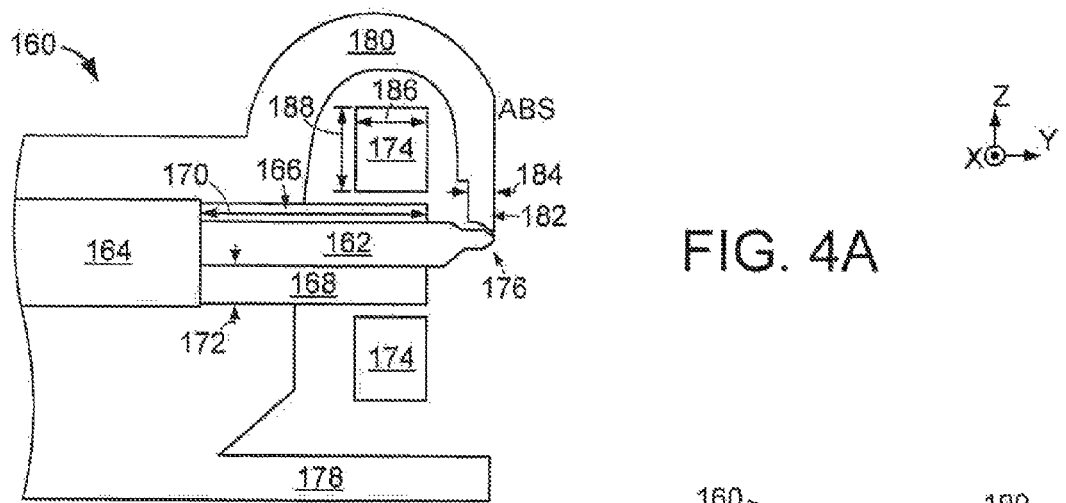
FIGS. 4A, 4B, and 4C illustrate line representations of portions of an example data writer configured in accordance with various embodiments.

In magnetic recording devices, a push towards greater data density corresponds with strong data write fields and narrow data track sizes. To provide sufficient on-track data writing performance with a reduced data writer size, strong write fields are utilized to saturate a data storage medium and generate transitions between data bits. However, strong data write fields can result in large erasure and detrimental magnetic flux leakage, which can be particularly harmful in high track density recording environments, such as shingled magnetic recording. Hence, there is a continued interest in physically small data writers that can utilize strong write fields without producing large erasure or lose large amounts of magnetic flux to leakage.

Accordingly, various embodiments configure a data writer with a narrow side shield gap to compensate for write field loss due to magnetic flux leakage. The utilization of a single write coil turn to generate magnetic flux with a short core length can optimize write field strength and provide increased writing efficiency compared to multi-turn write coils. With a lower magnetomotive force and faster write pole magnetic polarity switching, a data writer tuned in accordance with assorted embodiments can have decreased erasure fields and increased electrical performance.

FIG. 1 generally displays an example data storage system 100 that is arranged in accordance with some embodiments. Although not required or limiting, the data storage system 100 may have any number of data storage devices 102 that comprise one or more local controllers 104 and a data transducing assembly 106. The transducing assembly 106 can access one or more magnetic data bits 108 that are perpendicularly stored in and read from data tracks 110 on a data storage medium 112.

The transducing assembly 106 has a head that flies on an air bearing 114 produced by rotation of the data storage medium 112, as controlled by a centrally positioned spindle motor 116. In this way, the local controller 104 can dictate data access to and from the data medium 112 across the air bearing 114 by spinning the spindle motor 116 and activating the data writer 118. The data writer 118 can be formed with a write (main) pole 120 and a return pole 122 that are separated by a trailing shield 124 and create a writing circuit 126 to impart a desired magnetic orientation to the adjacent storage medium 112.

The data writer 118 further consists of a write coil 128 that can be one or many individual wires capable of imparting a magnetic flux on the write pole 120 that forms the writing circuit 126. The writing circuit 126 can be a magnetic path passing from the write pole 120 through a soft underlayer of the storage medium 112 to the trailing shield 124 and return pole 122 to a magnetic via and back to the write pole 120

While the data storage device 102 can operate alone, it is contemplated that one or more remote hosts 130, such as a server, node, or processor, can access and control the data storage device 102 via a wired or wireless network 132. The ability to connect any type, function, and number of computing components to the data storage device 102 remotely allows for customized utilization of the data storage device 102. Despite the ability to remotely and locally control the transducing head 106, increased data bit 108 density and reduced data track 110 width, as measured along the X axis, can stress the magnetic extent and precision of at least the data writer 118.

As a non-limiting example of a data storage environment 140 with increased data density, FIGS. 2A and 2B respectively show top view line representations of a portion of a data storage medium 112. The plurality of data tracks 110 in FIG. 2A displays how reduction in data track pitch 142 brings the data bits 108 closer together. Such decrease in track pitch between two data tracks 110 can make accurate data bit 108 sensing and writing difficult. For instance, accessing data bits 108 that are close to other adjacent on-track and off-track data bits 108 can require efficient supply and control of magnetic flux to allow different magnetic polarities to be successively written.

Although a strong write field can quickly write data bits 108 in an increased data density environment, such field strength can produce large erasure that inadvertently effect on-track and off-track data bits 108 in phenomenon known as side track erasure and adjacent track interference. FIG. 2B illustrates a shingled data storage environment where data tracks 110 partially overlap. That is, despite having the same track pitch 142 as the configuration of FIG. 2A, the tracks 110 in FIG. 2B are sequentially written to increase the overall number of data tracks 110 on a data storage medium 112. It can be appreciated that large erasure can degrade performance and accuracy of a shingled data storage environment as data bits 108 are more closely positioned than in the data storage environment shown in FIG. 2A.

FIG. 3 is an air bearing view line representation of a portion of an example data writer 150 configured in accordance with various embodiments to shield stray magnetic fields from a write pole 122. As shown, the write pole 122 has a trapezoidal shape, but not limited to this pole configuration, on an air bearing surface (ABS) that can reduce the erasure fringing field applied to the adjacent tack when the write pole is writing at a skew angle, and can improve the transition curvature in the trailing edge of the write bubble through magnetic flux redistribution to a predetermined region, such as proximal a trailing edge 152 of the pole 122. The write pole 122 is disposed between and separated from side shields 154 that provide cross-track protection from errant magnetic fields while a trailing shield 156 provides downtrack protection.

The respective shields 154 and 156 are used to confine the magnetic field generated from the write pole into storage medium. The proper field confining between the write pole, with high magnetic potential, and the shields, with low magnetic potential, will significantly improve field gradients along the down-track and cross-track directions. As a consequence, much higher linear and track densities can be achieved by using the trailing and side shields. The shields can be arranged in a diverse variety of manners that attempt to balance shielding of the write pole 122 with minimal shunting of flux from the write pole 122. In yet, such balance can be difficult to provide with increased data density, such as through the use of shingled recording, strong write fields used by the write pole 122, and decreased data writer size. Accordingly, some embodiments are directed to data writer configurations that optimize data writing dynamics by utilizing a single write coil turn, which contrasts the multiple coil turns shown in FIG. 1.

Figure 4B:
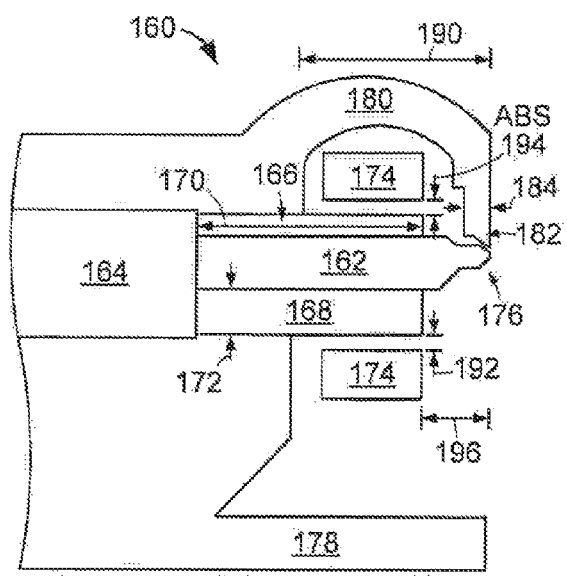
Figure 4C:
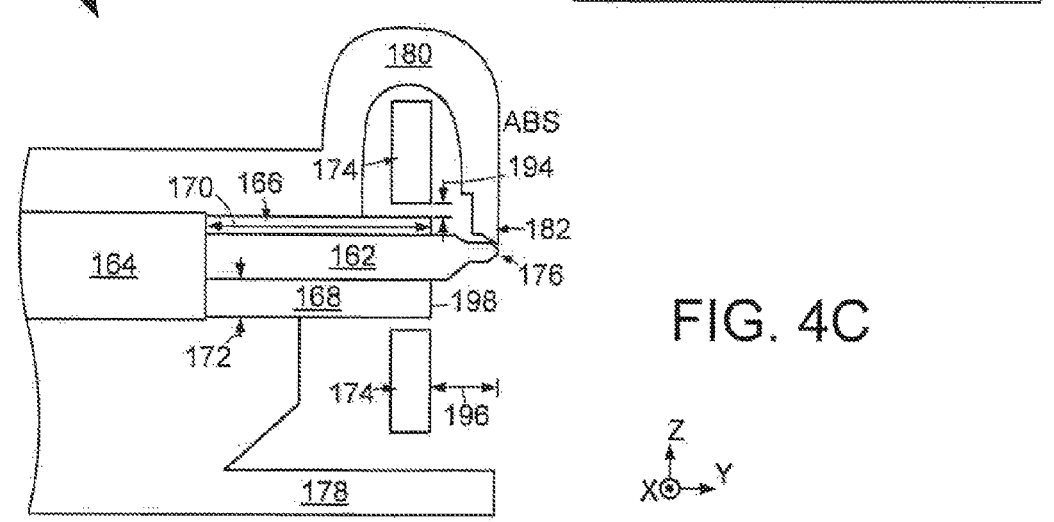

FIGS. 4A, 4B, and 4C respectively display cross-sectional line representations of portions of an example data writer 160 constructed and operated in accordance with assorted embodiments to provide increased performance through optimized writer dynamics. FIG. 4A illustrates a write pole 162 that continuously extends from an ABS to a magnetic via 164. Top 166 and bottom 168 yokes respectively contact opposite sides of the write pole 162 and are tuned for material, length 170, and thickness 172, and recess distance from the ABS, to efficiently direct magnetic flux from the write coil 174 to the write pole tip 176.

The write pole 162 is also disposed between bottom 178 and top 180 return poles that are each magnetically and physically connected to the via 164. Although not limiting or required, the top return pole 180 can be arranged to have more surface area on the ABS than the write pole tip 176 or bottom return pole 178. The increased amount of top return pole material on the ABS can correspond with a trailing position that travels over a data bit after the write pole 162.

The top return pole 180 is configured with multiple different regions 182 having smaller lengths 184 to taper the top return pole 180 towards the write pole 162. The various return pole regions 182 can have uniform or varying lengths 184 that mitigate the risk of magnetic shunting and flux leakage from the write coil 174 and the write pole 162. As a non-limiting example, a pole region 182 may be shaped to match a linear surface of the write pole tip 176 that extends from the ABS at a non-normal angle.

Such leakage can also be mitigated by tuning the size, position, and cross-sectional shape of the write coil 174. That is, the write coil 174 can have a length 186 and height 188 that define a cross-sectional shape that may be symmetrical, as shown in FIG. 4A, wide, as shown in FIG. 4B, or narrow, as shown in FIG. 4C. The ability to control the size and shape of the write coil 174 allows for efficient supply of magnetic flux to the write pole 162 without increasing the risk of flux leakage or large erasure being generated.

Along with the size and shape of the write coil 174, the position of the coil turn can be tuned to provide optimized writer performance through increased writer efficiency and dynamics. For example, the core length 190 of the yokes 166 and 168 and top return pole 180 can be shortened with a single coil turn configuration, such as to a length of 2.5 micrometers or less. To clarify, the core length 190 is defined as the distance from the ABS to the front edge of the top back via, as shown. A reduced core length 190 can be complemented by a reduced coil separation height 192 and 194, such as 200 nanometers or less, and coil recess length 196 from the ABS, such as 0.7-1.1 micrometers. It is noted that the write coil 174 can be aligned with a front surface 198 of the yokes 166 and 168, as shown, but such arrangement is not limited to or required as the position of the write coil 174 relative to the yokes 166 and 168 can be tuned to have different recess lengths 196.

The data writer 160 may also be tuned for materials to provide increased magnetic writing efficiency. It is contemplated that the yokes 166 and 168 may be similar or dissimilar materials with magnetic saturations that match the write pole 162, such as 2.4 T, or that match the return poles 178 and 180, such as 1.8 T. With the ability to tune the various aspects of the data writer 160, a single write coil turn can sufficiently supply magnetic flux to the write pole 162 to write data in heightened data density recording environments.

Figure 5:
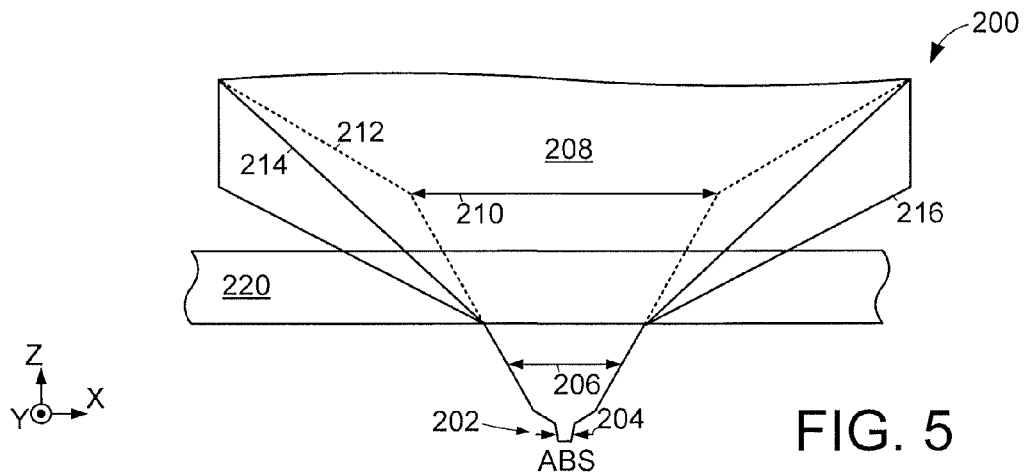
FIG. 5 depicts a top-down view line representation of a portion of an example data writer paddle and write coil constructed and operated in accordance with some embodiments.

In accordance with some embodiments, the write pole 162 is shaped to optimize magnetic flux delivery with a single write coil turn. FIG. 5 is a line representation of a portion of an example write pole 200 configured with varying widths, as measured along the X axis, to efficiently transmit magnetic flux to an adjacent data storage medium. The write pole 200 has a write pole tip 202 positioned on an ABS. The write pole tip 202 can have any shape and size defined by a uniform or varying first width 204. A varying second width 206 can continuously extend from the write pole tip 202 and provide a tapered write pole shape towards the ABS.

With a single coil turn, the write pole 200 is constructed with a varied shape paddle region 208, which can be provided by segmented sidewalls 212 and solid sidewalls 214 or 216 that define a varying paddle third width 210 and varying flare shapes in the back portion of the paddle. The ability to tune the size and shape of the respective write pole regions 202, 206, and 208 allows magnetic flux accumulation and transmission to the ABS to be customized to the environment, such as the configuration of the yokes and return poles as well as the data density and recording scheme being written to.

Various embodiments align the paddle region sidewalls 214 or 216 with the write coil 220. Such a change in sidewall configuration provides a greater surface area being exposed to the coil 220 than if the segmented line 212 was utilized. The greater surface area of the paddle region 208 can be complemented by aligning the write coil 220 with a predetermined portion of the paddle region 208. In the non-limiting example of FIG. 5, the write coil 220 is recessed from the ABS to match where the paddle region sidewalls 214 or 216 transition from the second varying width 206. In other words, the write pole 200 is configured to align with the increased surface area provided by the high flare shapes in the back portion of the paddle region 208, which corresponds with increased flux transmission and efficiency.

Figure 6:
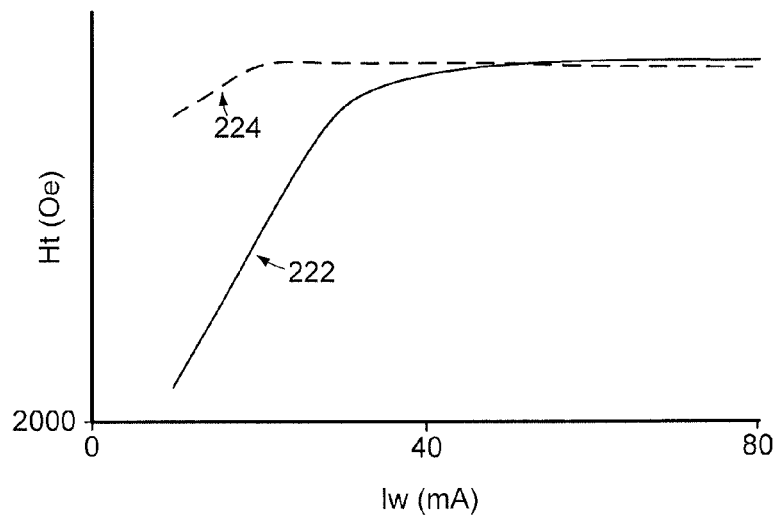
FIG. 6 graphs operational static write field data for example data writers configured in accordance with assorted embodiments.

By tuning the various aspects of a data writer, data writing performance can be heightened. FIG. 6 plots operational data for example data writers configured in accordance with some embodiments. Solid line 222 represents a single coil turn data writer while segmented line 224 corresponds with a multi-turn data writer. In theory, the single coil turn data writer and the multi-turn writer have the same static write efficiency. For example, to generate the same amount of write field, the single turn writer will need three times greater write current than a 3-turn data writer, and the two designs have the same MMF.

However, FIG. 6 illustrates how the single turn data writer saturates at approximately 50 mA in solid line 222 while the multi-turn data writer saturates at approximately 20 mA in segmented line 224, which is less than 3 time great. Hence, the tuned configuration of the single turn data writer provides better efficiency than a multi-turn data writer. It is contemplated that the better write efficiency of the single turn data writer provides a lower side track erasure under the same write field than a multi-turn data writer.

Figure 7:
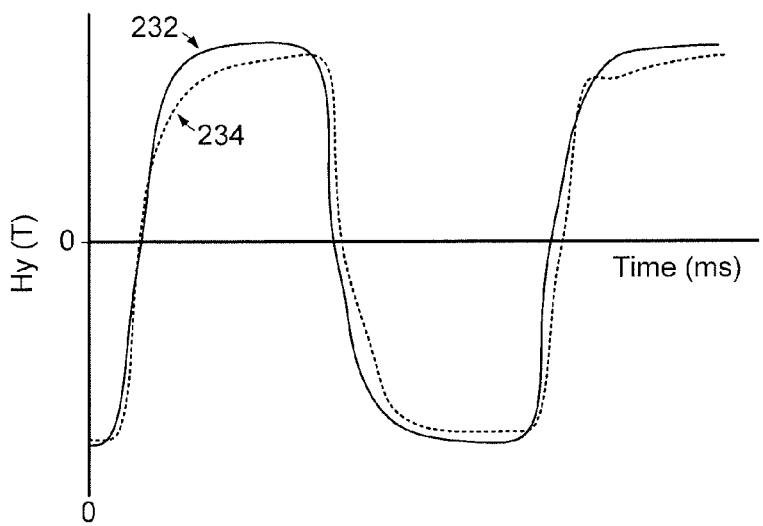
FIG. 7 plots operational dynamic write field data for example data writers utilized in accordance with various embodiments.

Modeling confirms that a tuned single turn data writer can achieve the same level of static write field and gradient as a multi-turn writer, but with 20% or more reduction in flux leakage into a side shield. The lower amount of leaking magnetic flux provides reduced risk of side track erasure and faster field switching than a multi-turn data writer. FIG. 7 graphs a write field waveform comparison between example single turn and multi-turn data writers that are arranged in accordance with various embodiments. Solid line 232 shows how a single turn data writer has a faster field rise-time than the multi-turn data writer represented by segmented line 234. Such faster field switching may occur partially from increased magnetic efficiency and partially from higher driving current amplitude in the single turn data writer compared to the multi-turn data writer.

As an example comparison between a single turn data writer tuned in accordance with some embodiments and a two coil turn data writer, the single turn data writer provides optimized write field and gradient. The single turn data writer allows for a 500 nm smaller yoke and coil recess distance from the ABS and a 30-40% increase in write current. The stronger write current in the single turn data writer does not increase the risk of side track erasure and instead provides a lower erasure field. The ability to tune the shape and size of the write pole, as shown in FIG. 5, flux conduction between the coil and write pole is optimized to generate better flux concentration in the write pole tip, which aids pole tip field switching speed.

Figure 8:
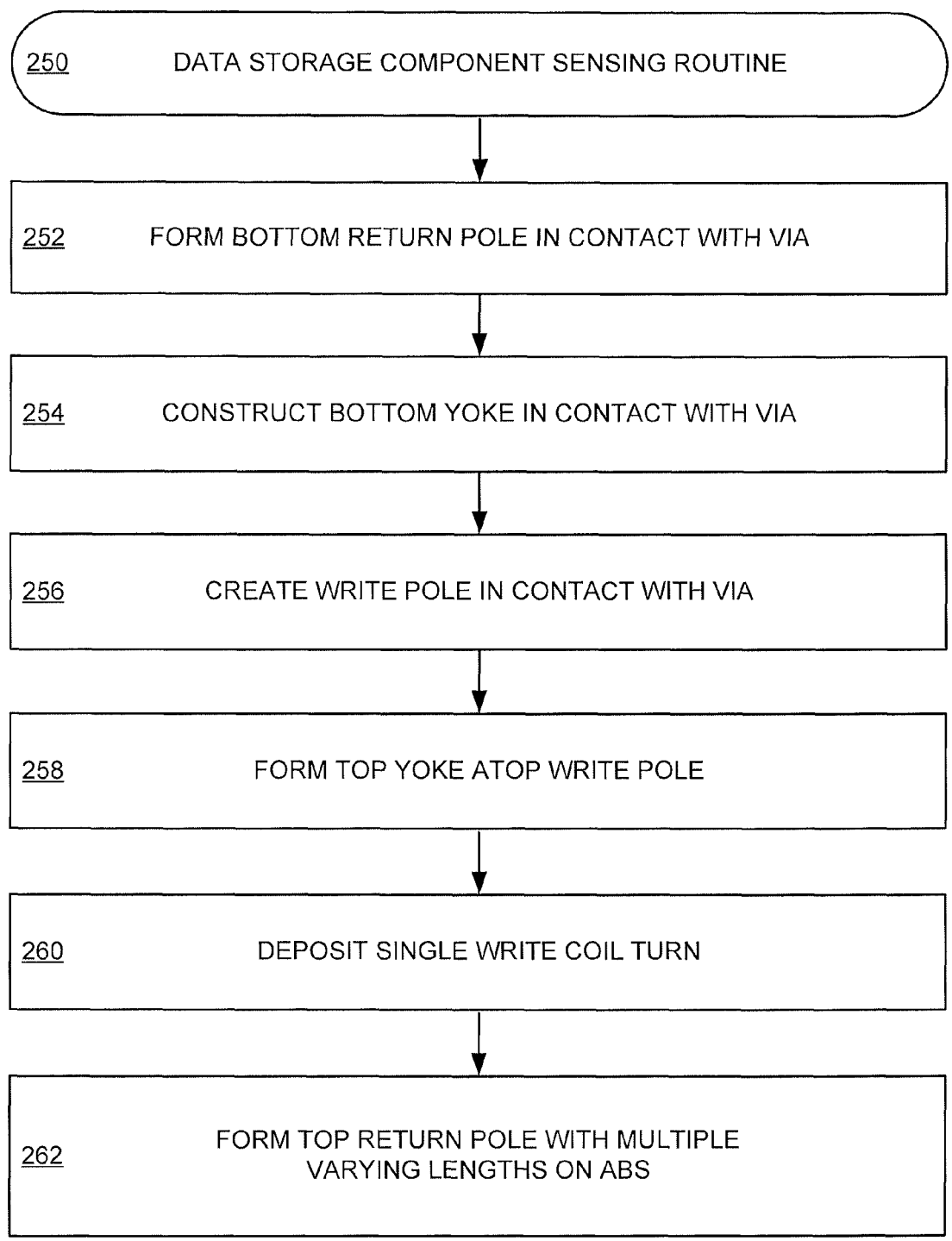
FIG. 8 provides a flowchart of a data writer fabrication routine carried out in accordance with some embodiments.

FIG. 8 is a flowchart of an example data writer fabrication routine 250 that can be carried out in accordance with assorted embodiments to produce a tuned single coil turn data writer. The routine 250 begins with step 252 forming a bottom return pole. The bottom return pole may physically and magnetically connect with a via positioned distal the ABS. Step 254 proceeds to construct a bottom yoke in physical and magnetic connection with the via. The bottom yoke can be tuned in step 254 to have any shape, length, recess distance from an ABS, and thickness to optimize magnetic flux concentration and transmission in a write pole deposited in step 256.

It is contemplated that a portion of a write coil is formed prior to step 254, but such step is not required or limiting. The write pole may be created in step 256 in any number of processes that provide multiple different regions having uniform or varying widths tuned to optimize flux delivery to the ABS. Next, step 258 forms a top yoke in contact with the write pole and via. The top yoke can be configured to be the same, or different, than the bottom yoke with tuned shape, length, recess distance, thickness, and material. Some, or all, of a single write coil turn is deposited in step 260 to position a continuous helical magnetic wire proximal opposite sides of the write pole. The deposition of step 260 may further position the write coil a predetermined separation distance from the top and bottom yokes, which may be smaller than the separation distance used for a multi-turn data writer.

Routine 250 continues by forming a top return pole in step 262 to continuously extend from the via to the ABS. In some embodiments, the top return pole has multiple tapered regions that decrease the length of the pole on the ABS towards the write pole. It is noted that the various steps of routine 250 are not limiting and changes and additional steps and decisions can be incorporated at will just as existing steps can be removed. For example, an additional decision may evaluate and determine if the material construction of the top and/or bottom yokes is to match the write pole, such as 2.4 T, or the return poles, such as 1.8 T.

Through the various embodiments, utilization of a single write coil turn results in a data writer with a smaller coil recess and shorter core length than a multi-turn data writer, which optimizes the data writer's efficiency and dynamics. The tuned single coil turn configuration reduces erasure fields and increases data bit writability to achieve on-track performance gains despite lower MMF than a multi-turn data writer. The ability to provide faster field switching with reduced overall writing power through optimized efficiency of the tuned single turn data writer allows for heightened performance and adaptability to increasing data storage device data density demands.

It should be noted while the embodiments have been directed to magnetic writing, the claimed embodiments can readily be utilized in any number of other applications, including data reading applications. Furthermore, it is to be understood that even though numerous characteristics and configurations of various embodiments of the present disclosure have been set forth in the foregoing description, together with details of the structure and function of various embodiments, this detailed description is illustrative only, and changes may be made in detail, especially in matters of structure and arrangements of parts within the principles of the technology to the full extent indicated by the broad general meaning of the terms in which the appended claims are expressed.

What is claimed is:

1. An apparatus comprising a write pole continuously extending from a write pole tip at an air bearing surface (ABS) to a via, the write pole tip extending from a first width of a first tapered portion on the ABS to a second tapered portion, the first tapered portion having a first varying width and the second tapered portion having a second varying width, the write pole having a write pole tip disposed between and separated from a write coil having a single turn and continuously extending to opposite sides of the write pole, the second tapered portion aligned with the write coil.

2. The apparatus of claim 1, wherein the write coil is separated from the ABS by a common distance on the opposite sides of the write pole.

3. The apparatus of claim 1, wherein the write coil has a cross-sectional aspect ratio with a greater height than width, the height measured parallel to the ABS and the width measured perpendicular to the ABS.

4. The apparatus of claim 1, wherein the write coil has a cross-sectional aspect ratio with a greater width than height, the height measured parallel to the ABS and the width measured perpendicular to the ABS.

5. The apparatus of claim 1, wherein the first varying width is less than the second varying width.

6. An apparatus comprising a write pole continuously extending from an air bearing surface (ABS) to a via, the write pole contacting top and bottom yokes respectively positioned on opposite sides of the write pole, the write pole and yokes disposed between and separated from a write coil having a single turn and continuously extending to opposite sides of the write pole, a front edge of each yoke aligned with a front edge of the write coil along a plane parallel to the ABS, the write coil aligned with a transition in a paddle portion of the write pole from a first varying width to a second varying width.

7. The apparatus of claim 6, wherein the top and bottom yokes each continuously extend from the via.

8. The apparatus of claim 6, wherein the top and bottom yokes have a lower magnetic moment than the write pole.

9. The apparatus of claim 6, wherein the write coil is separated from each yoke by 200 nm or less.

10. The apparatus of claim 6, wherein each yoke has a core length of 2.5 micrometers or less, the core length measured from a front edge of each yoke to the via perpendicular to the ABS.

11. The apparatus of claim 6, wherein the write pole tapers from each yoke to a write pole tip.

12. The apparatus of claim 6, wherein the front edge of each yoke and the front edge of the write coil each face the ABS.

13. The apparatus of claim 12, wherein the front edges of the yokes and write coil are separated from the ABS by 0.7-1.1 micrometers.

14. An apparatus comprising a write pole continuously extending from an air bearing surface (ABS) to a via, a top return pole continuously extending from the ABS proximal the write pole to the via, the write pole disposed between and separated from a write coil positioned between the top return pole and write pole, the write coil having a single turn and continuously extending to opposite sides of the write pole, the write coil aligned with a transition in a paddle portion of the write pole from a first varying width to a second varying width.

15. The apparatus of claim 14, wherein the write pole is disposed between top and bottom return poles on the ABS.

16. The apparatus of claim 15, wherein the top return pole has a different shape than the bottom return pole.

17. The apparatus of claim 14, wherein the paddle portion of the write pole comprises first, second, and third tapered portions each with varying lengths as measured perpendicular to the ABS.

18. The apparatus of claim 17, wherein the respective tapered portions decrease towards the write pole.

19. The apparatus of claim 17, wherein the third tapered portion is oriented parallel to the first portion, the third portion separated from a write pole tip by the first portion.

20. The apparatus of claim 14, wherein the top return pole has a greater height on the ABS than the write pole.

* * * * *